3,264,359
DIHALOCARBENE PROCESS
Richard T. Dickerson, Midland, Mich., and Harry M. Walborsky, Tallahassee, Fla., assignors to The Dow Chemical Company, Midland, Mich., a corporation of Delaware
No Drawing. Filed Aug. 25, 1961, Ser. No. 133,788
3 Claims. (Cl. 260—648)

This invention relates to an improved process for carrying out dihalocarbene reactions. More particularly, it relates to an improved process for making 2,2-dihalocyclopropyl compounds.

The reaction whereby a haloform, a compound containing an olefinic double bond, and an alkali alkoxide are reacted together to form first an intermediate dihalocarbene radical which then adds to the olefinic double bond to make a 2,2-dihalocyclopropyl compound is now well known and has proven very useful from both theoretical and practical points of view. The reaction is shown diagrammatically by the following equations:

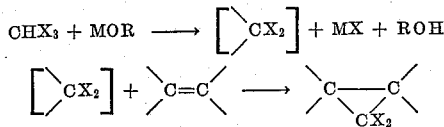

wherein X represents chlorine or bromine, M is sodium or potassium, and R is an alkyl radical, usually the tert-butyl group. The reaction is conventionally run at temperatures of 0° C. or lower using essentially equimolar proportions of the haloform, olefin, and alkali alkoxide reactants. A side reaction between the unstable dihalocarbene intermediate and the alcohol formed in the reaction may occur to the extent that the yield of dihalocyclopropyl compound is substantially lowered. It has been suggested (by Parham and Schweizer, J. Org. Chem. 24, 1733) that this side reaction can be avoided by using an alkyl trihaloacetate in place of a haloform as the source of dihalocarbene, the by-product then being a dialkyl carbonate instead of the interfering alcohol. However, alkyl trihaloacetates are relatively inconvenient to use as compared to the cheap and easily available haloforms. In addition, the reaction still must be run at ice temperature or below.

We have now found that this reaction may be run under more convenient conditions and that the formation of the undesirable alcohol by-product can be avoided by reacting a mole of haloform with about one mole of olefinic double bond in the presence of an alkali metal alkoxide where there is also present at least about one mole of alkali metal hydride.

In the presence of the alkali metal hydride, the alcohol which forms in the reaction is immediately and continuously converted to the alkali metal alkoxide and hydrogen which, being inert in the reaction, passes off and escapes. Since the alkoxide is regenerated throughout the reaction, it is necessary to use only a small or catalytic quantity at the start and this small amount is conveniently prepared in situ from some of the corresponding alcohol and a little excess hydride. There is therefore no necessity to use as such the alkali metal alkoxide which may not be easily obtainable and in all cases requires care in handling.

We have found that by using this new technique, the process is suitably run at about 30–100° C., preferably at 40–60° C., a more convenient level of reaction temperature than that previously used, because simpler means of cooling are adequate to control the highly exothermic reaction. The threshold temperature of reaction varies somewhat with the alcohol used to form the initial alkoxide. For example, when methanol and sodium hydride are used, reaction starts at or slightly above 30° C., and when tert-butyl alcohol is used, reaction begins as the temperature approaches 40° C.

Other conditions and reactants are those known for this reaction. For example, the reaction may be carried out in an inert solvent such as hexane or heptane or no solvent need be used, an excess of the olefinic reactant serving as a reaction medium. The proportions of reactants are typically one mole of haloform to about one mole of olefinic compound, except where more olefin may be used as a solvent, and at least about one mole of alkali metal hydride.

In using our new process, we have found that about 0.05 and 0.5 mole of alkoxide per mole of haloform is suitable. The minimum quantity of alkoxide which may be used with satisfactory results depends upon the reactivity of the particular alkoxide used. Alkali metal tert-butoxides and methoxides are more efficient in the process and require a smaller proportion than, for example, the ethoxides. The alkali metal salts of tert-amyl alcohol are also especially effective. The alkali metal salts of other alcohols may also be used, for example, those of isopropyl alcohol, n-butyl alcohol, pinacol, and benzyl alcohol, although these are usually not preferred, for they are more prone to enter side reactions with the $CX_2$ intermediate and are thereby consumed.

By the term alkali metal in relation to both the alkoxides and the hydrides in this application is meant either sodium or potassium. Similarly, the term haloform as used in this application applies to chloroform and to bromoform as well as to the mixed haloforms, bromodichloromethane and dibromochloromethane.

The olefinic compounds which take part in the reaction are those known to the art in this connection and include simple olefins such as the alkylated ethylenes, polyolefins such as butadiene, isoprene, decatetraene, cyclic olefins such as cyclopentene and vinylcyclohexene, vinyl aromatics such as styrene and vinyltoluene, and halogenated derivatives of these where the halogen is not reactive with hydrides or alkoxides, for example, p-chlorostyrene. Also included are polymeric materials containing olefinic bonds, for examples, rubbers and polybutadiene.

The following examples illustrate specific modes of operation of our process.

*Example 1*

To a 500 cc. reaction flask equipped with thermometer, reflux condenser, dropping funnel, and stirrer there was added 123 g. of dry cyclohexene, 30 g. of a 50% suspension of finely divided sodium hydride in light petroleum oil, and 8 cc. of tert-amyl alcohol. The mixture was then heated and stirred. At a reaction mixture temperature of about 40° C., evolution of hydrogen began and the evolved gas was measured by passing it through a test meter. At this point, the portionwise addition of 126.5 g. of bromoform was begun through the dropping funnel. The reaction temperature was permitted to rise to 60° C. where it was maintained by use of a water bath to the end of the reaction. The bromoform was added to the reaction mixture as rapidly as the limitations of cooling and hydrogen evolution would permit. After the bromoform had been added and hydrogen evolution had ceased, water was cautiously added to the reaction mixture to decompose unreacted sodium hydride and the mixture was steam distilled. The organic phase of the distillate was dried over anhydrous sodium sulfate and redistilled under reduced pressure, yielding 110 g. of 7,7-dibromonorcarane, B.Pt. 57–58° C./0.8 mm.

*Example 2*

A reaction flask as described in Example 1 was charged with 100 cc. of n-heptane, 24 g. of a 50% by weight dispersion of sodium hydride in light petroleum oil, and 5 cc. of tert-butyl alcohol. This mixture was warmed to 40° C., causing the evolution of 0.7 l. of hydrogen, and 60 g. of styrene was added. The dropwise addition of 60 g. of chloroform was then begun, the temperature being maintained at 45–55° C. during the addition. A few drops of polypropylene glycol having an average molecular weight of about 2000 were added during the reaction to control foaming caused by the evolution of hydrogen. Before all of the chloroform had been added, evolution of hydrogen stopped and an additional 6 g. of sodium hydride dispersion together with about 3 cc. of isopropyl alcohol was added to the reaction mixture. The reaction then proceeded with evolution of hydrogen until all of the chloroform had been added. A further 7 cc. of isopropyl alcohol was added to the reaction mixture to decompose residual sodium hydride, following which the reaction mixture was steam distilled. The oil layer so obtained was dried and distilled under reduced pressure. There was obtained 72 g. of (2,2-dichlorocyclopropyl)benzene.

*Example 3*

A reaction was run as described in Example 2 except that isopropyl alcohol was used in place of tert-butyl alcohol. A total of 23 cc. of isopropyl alcohol was required, most of this being added in portions during the reaction. The reaction was less efficient than in Example 2 where tert-butyl alcohol was used and only 21 g. of (2,2-dichlorocyclopropyl)benzene was obtained.

In the manner described in Example 2, bromoform was reacted with 4-vinylcyclohexene and with α-methylstyrene to make 7,7-dibromo-3-vinylnorcarane and (2,2-dibromo-1-methylcyclopropyl)benzene respectively.

Examples 4 and 5 illustrate the improved yield obtained by the new method as compared to the old when methanol is used, even though the methanol be removed by distillation and thereby not allowed to accumulate in the reaction conducted under the prior art procedure.

*Example 4*

An apparatus was assembled which permitted the continuous removal by distillation of a low-boiling component from a reaction mixture under reduced pressure. The apparatus was charged with 127 g. of bromoform, 180 g. of styrene, 0.1 g. of p-tert-butyl-pyrocatechol inhibitor, and 1 cc. of polypropylene glycol P-2000, an antifoam agent. A solution of 22 g. of sodium methoxide in 78 g. of methanol was gradually introduced into the stirred mixture at 50 mm. Hg. absolute pressure and pot temperature of 60° C. Occasional heating was required to maintain this temperature because of the vaporization of the methanol. As the reaction proceeded, the solvent methanol and that formed by the reaction was accordingly distilled away and not allowed to accumulate. After all the sodium methoxide solution had been added, 200 g. of ice was added to the reaction mixture and the two resulting liquid phases were separated. The organic layer was first steam distilled, then distilled under reduced pressure to obtain 16 g. of (2,2-dibromocyclopropyl)benzene, a yield of 11.6% based on the bromoform.

*Example 5*

When the above reagents are reacted under the procedure of Example 1, using about 14 cc. of methanol and about 30 g. of 50% suspension of sodium hydride in place of the methanolic sodium methoxide, yields of (2,2-dibromocyclopropyl)benzene of about 50% are obtained.

We claim:

1. In the method for making 2,2-dihalocyclopropyl compounds by the reaction of one mole of a haloform of the formula $CHX_3$ wherein X is a halogen of atomic number from 17 to 35 with about one molar equivalent of an olefinic compound selected from the group consisting of acyclic and alicyclic olefinic hydrocarbons, vinyl aromatic hydrocarbons, and vinyl haloaromatic hydrocarbons in the presence of an alkali metal alkoxide of 1–5 carbon atoms, said alkali metal having an atomic number from 11 to 19, the improvement of carrying out said reaction in the additional presence of at least about one mole of an alkali metal hydride, said alkali metal having an atomic number from 11 to 19.

2. The process of claim 1 wherein the reaction is carried out at about 30–100° C.

3. The process of claim 1 wherein there is present about 0.05–0.5 mole of alkali metal alkoxide per mole of haloform.

References Cited by the Examiner

UNITED STATES PATENTS 2,267,733  12/1941  Hansley _____ 260—632
3,044,999   7/1962  Tousignant _____ 260—648

OTHER REFERENCES

Doering et al.: J. Am. Chem. Soc., vol. 76, pp. 6162–6165 (1954).
Leitich: Oesterreichische Chemiker Zeitung, vol. 61, No. 6, June 1960, pp. 164–72.
Noller: "Chem. of Org Compounds," p. 88 (1951).
Skell et al.: Jour. Am. Chem. Soc., vol. 81 (1959), pp. 4117–8.

LEON ZITVER, *Primary Examiner.*

MILTON STERMAN, *Examiner.*

S. H. BLECH, K. H. JOHNSON, K. V. ROCKEY,
*Assistant Examiners.*